United States Patent [19]
Donovan et al.

[11] Patent Number: 5,128,677
[45] Date of Patent: Jul. 7, 1992

[54] APPARATUS AND METHOD FOR TRANSFERRING DATA ALONG A SERIAL DATA BUS

[75] Inventors: Paul M. Donovan, Santa Clara, Calif.; Michael P. Caruso, Sudbury, Mass.

[73] Assignee: Apple Computer, Inc., Cupertino, Calif.

[21] Appl. No.: 407,570

[22] Filed: Sep. 15, 1989

[51] Int. Cl.$^5$ .............................................. G08C 19/12
[52] U.S. Cl. ................................ 341/177; 340/825.62; 340/825.63; 340/825.65; 340/870.19; 375/22
[58] Field of Search ................... 341/177, 178, 89, 53; 340/870.19, 870.24, 825.62, 825.63, 825.65; 375/22, 89

[56] References Cited

U.S. PATENT DOCUMENTS

| | | | |
|---|---|---|---|
| 3,965,468 | 6/1976 | Bronson | 341/178 |
| 4,128,832 | 12/1978 | Betts | 341/89 |
| 4,146,743 | 3/1979 | Raynham | 178/69.1 |
| 4,189,713 | 2/1980 | Duffy | 340/825.63 |
| 4,228,422 | 10/1980 | Perry | 340/870.24 |
| 4,231,031 | 10/1980 | Crowther | 340/825.63 |
| 4,472,686 | 9/1984 | Nishimura | 341/53 |
| 4,700,358 | 10/1987 | Duncanson et al. | 375/8 |
| 5,027,109 | 6/1991 | Donovan et al. | 340/706 |

FOREIGN PATENT DOCUMENTS

1519779  8/1978  United Kingdom .......... 340/823.62

Primary Examiner—Donald J. Yusko
Assistant Examiner—Michael Horabik
Attorney, Agent, or Firm—Blakely, Sokoloff, Taylor & Zafman

[57] ABSTRACT

An apparatus and method are disclosed for transferring data between devices located on a serial data bus of a data communication system. A first counter and flag are provided which are associated with a device on the serial data bus. The first counter and flag are coupled to the serial data bus for determining temporal periods of high signal levels on the data bus. A second counter and flag also associated with the device on the serial data bus is coupled to the data bus for determining temporal periods of low signal levels on the data bus. A logic demodulator is provided which is coupled to the first and second counter and flag for demodulating the high and low signal levels to binary data and for using this binary data to perform a pertinent function of the device. A transmitter is coupled to an output of the first and second counter and flag and to the demodulation logic for modulating binary data received from the device while performing its pertinent function. The resulting modulated data is thus input onto the serial data bus.

11 Claims, 11 Drawing Sheets

FIG_1

FIG_2

FIG_7

FIG.—H

ADBLOW IS A BINARY RIPPLE COUNTER. IN ORDER FOR THE Q OUTPUTS OF THE BLOCK TO COUNT UP, THE Q OUTPUTS OF THE FLIP FLOPS MUST BE INVERTED.

APPARATUS AND METHOD FOR TRANSFERRING DATA ALONG A SERIAL DATA BUS

CROSS-REFERENCE TO RELATED APPLICATIONS

The present application is related to (1) U.S. patent application Ser. No. 07/407,575, filed on even date herewith, entitled "APPLICATION SPECIFIC INTEGRATED CIRCUIT FOR A SERIAL DATA BUS;" (2) U.S. patent application Ser. No. 07/664,480, filed Mar. 4, 1991, which is a continuation of U.S. patent application Ser. No. 07/357,419, filed May 24, 1989, entitled "APPARATUS AND METHOD FOR OPTICAL ENCODING," now abandoned; and (3) U.S. patent application Ser. No. 07/363,586, filed Jun. 8, 1989, entitled "APPARATUS AND METHOD FOR MINIMIZING UNDESIRED CURSOR MOVEMENT IN A COMPUTER CONTROLLED DISPLAY SYSTEM," which issued as U.S. Pat. No. 5,027,109 on Jun. 25, 1991.

FIELD OF THE INVENTION

The present invention relates to apparatus and methods for transferring data between data communication devices. More particularly, the present invention relates to data transfer along a serial data bus of a data communication system.

BACKGROUND OF THE INVENTION

In the computing industry, it is quite common to transfer data between a plurality of devices on a serial data bus. In one conventional data transferring method, a signal from the data bus is demodulated using high and low counters. A high counter and associated decode logic counts when the data bus signal is high, and the low counter and associated decode logic counts when the data bus signal is low. The demodulated serial data results in binary values which are stored in registers and used appropriately in the device.

The output from the device is modulated by shifting binary values in a register and modulating these binary values by a second set of high and low counters and associated decode logic. The resulting signal is output on the serial data bus.

Said use of two sets of counters in turn requires digital logic and transistors in the support thereof.

SUMMARY AND OBJECTS OF THE INVENTION

One objective of the present invention is to provide an apparatus and method for transferring data between devices located on a serial data bus of a data communication system that minimizes the number of counters.

Another objective of the present invention is to provide an apparatus and method for transferring data between devices located on a serial data bus of a data communication system that can be used with a variety of data communication devices, including cursor control devices.

Another objective of the present invention is to provide an apparatus and method for transferring data between devices located on a serial data bus of a data communication system that provides a relatively economical, reliable, and mechanically simple data transferring means.

These and other objects of the invention are provided for by an apparatus and method for transferring data between devices located on a serial data bus of a data communication system. First counting and flag means are provided which are associated with a device on the serial data bus. The first counting and flag means are coupled to the serial data bus for determining temporal periods of high signal levels on the data bus. Second counting and flag means also associated with said device on the serial data bus is coupled to the data bus for determining temporal periods of low signal levels on the data bus.

Demodulation logic means is provided which is coupled to the first and second counting and flag means for demodulating the high and low signal levels to binary data and for using this binary data to perform a pertinent function of the device. Transmitting means is coupled to an output of the first and second counting and flag means and to the demodulation logic for modulating binary data received from the device while performing its pertinent function. The resulting modulated data is thus input onto the serial data bus.

BRIEF DESCRIPTION OF THE DRAWINGS

The present invention is illustrated by way of example and not limitation in the figures of the accompanying drawings in which like references indicate similar elements and in which:

FIG. 8 is a logic diagram of the low counter of the ASIC.

FIG. 10 is a logic diagram of the transmitter means for receiving high and low counting signals, pertinent signals from the chip, and signals from the demodulation logic.

DETAILED DESCRIPTION

Figure 1:
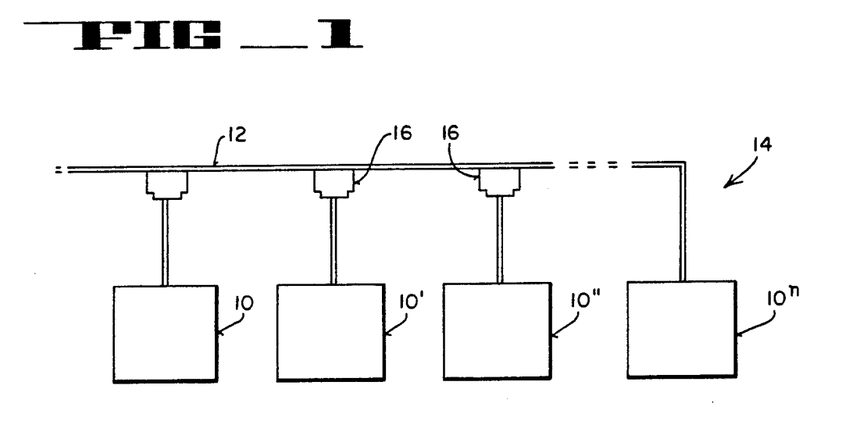
FIG. 1 illustrates a data communication network.

FIG. 1 illustrates a plurality of data communication devices, designated generally as 10, 10' . . . 10$^n$, located on a serial data bus 12 of a data communication system, designated generally as 14. Such data communication devices may include a portion of a computer, such as a transceiver chip, or a peripheral device such as a cursor control device (e.g., a mouse or a trackball), a keyboard, a printer, or a scanner. As shown, devices 10–10$^n$ are serially interconnected for data transfer to one another by a common data bus 12.

The various devices are coupled to cable 12 by connection modules 16 which, in a preferred embodiment, contain a passive coupling transformer, resistive and capacitive circuits, and are known in the art for coupling each of the data processing and other devices to cable 12.

As will be described, a preferred embodiment permits synchronous serial communication and data transfer between devices $10$-$10^n$. The architecture and protocols of a preferred embodiment minimize handshake complexities common in prior systems, and permits high speed serial communication along cable 12.

In a preferred embodiment, data is encoded as a ratio of low time to high time of each bit cell. A bit cell boundary is defined by a falling edge on the bus. A "0" is encoded as a bit cell in which the low time is greater than the high time. Therefore, a "1" is defined as a bit cell in which the low time is less than the high time.

The period for each bit cell of the command signals and low speed data transmission is approximately 100 μSec.±30%. For high speed data transmission, the bit cell is 25 μSec.±16%. The format of a data transaction, whether receiving or transmitting, is a start bit, followed by up to 256 bits of data and ending with a stop bit. It will be appreciated that when other communications media are utilized, other signalling methods may be utilized.

Figure 2:
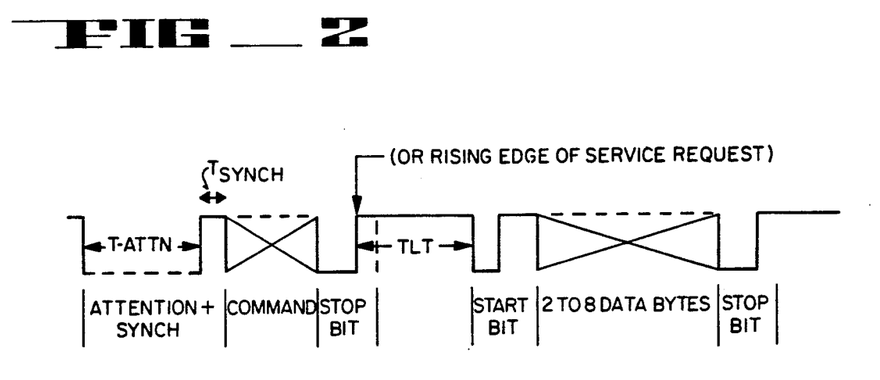
FIG. 2 is a timing diagram illustrating a command protocol.

FIG. 2 illustrates a typical protocol for providing transactions between a host computer and a specific device, such as a cursor control device, located on the serial data bus. As shown in this figure, to signal the start of a command, an attention pulse is sent out on the serial data bus by a host computer. An attention pulse is generated by the host computer by transmitting a bus low for a period of "T-attn". In the preferred embodiment, T-attn is approximately 560-1040 microseconds. The attention pulse is followed by a synch pulse, $T_{synch}$, to provide the initial bus timing. The following edge of the synch pulse is used as a timing reference for the first bit of the command. The command is followed by a stop bit. After the stop bit, the bus returns to its normally high state, $T_{lt}$.

The command is an 8 bit value in a preferred embodiment. The command includes a 4 bit device address field which specifies the address of the desired peripheral device (e.g., 0011 for a mouse). The next 2 bits form the command and the final 2 bits form a registered address field which allows a specific register R0-R3 within an addressed peripheral device to be specified. In a preferred embodiment, the commands have the following bit code:

| Command | Code |
|---|---|
| Flush | 0001 |
| Listen | $10R_1R_0$ |
| Talk | $11R_1R_0$ |
| Send Reset | 0000 |

The talk command orders the addressed device to provide its data, if the device has data, to the host computer. The listen command orders the addressed device to accept data from the host computer and place it in one of its registers. The flush command has an effect on each device which is defined by the individual device. It can be used for such functions as clearing a register or resetting all keys on a keyboard so that they will be sent again. The SendReset command forces a hardware reset of all devices connected to the ADB.

When a peripheral device is addressed to talk, it must respond within a certain period, called the "time out" period. The time out, "$T_{lt}$", is approximately 140 to 260 microseconds (2 bit cells). The selected device, if it does not time out, becomes active on the bus and performs its data transaction (e.g. 2 to 8 data bytes) and then provides a stop bit onto the serial data bus.

Depending on the command byte (8 bits) from the host CPU, the device will either demodulate data if there was a listen command just as it did for the command byte or it will modulate data out if there was a talk command from the command byte. The command bits will either signify contained modulation of the serial data bus or will signify modulation of device specific data out onto the data bus.

Figure 3:
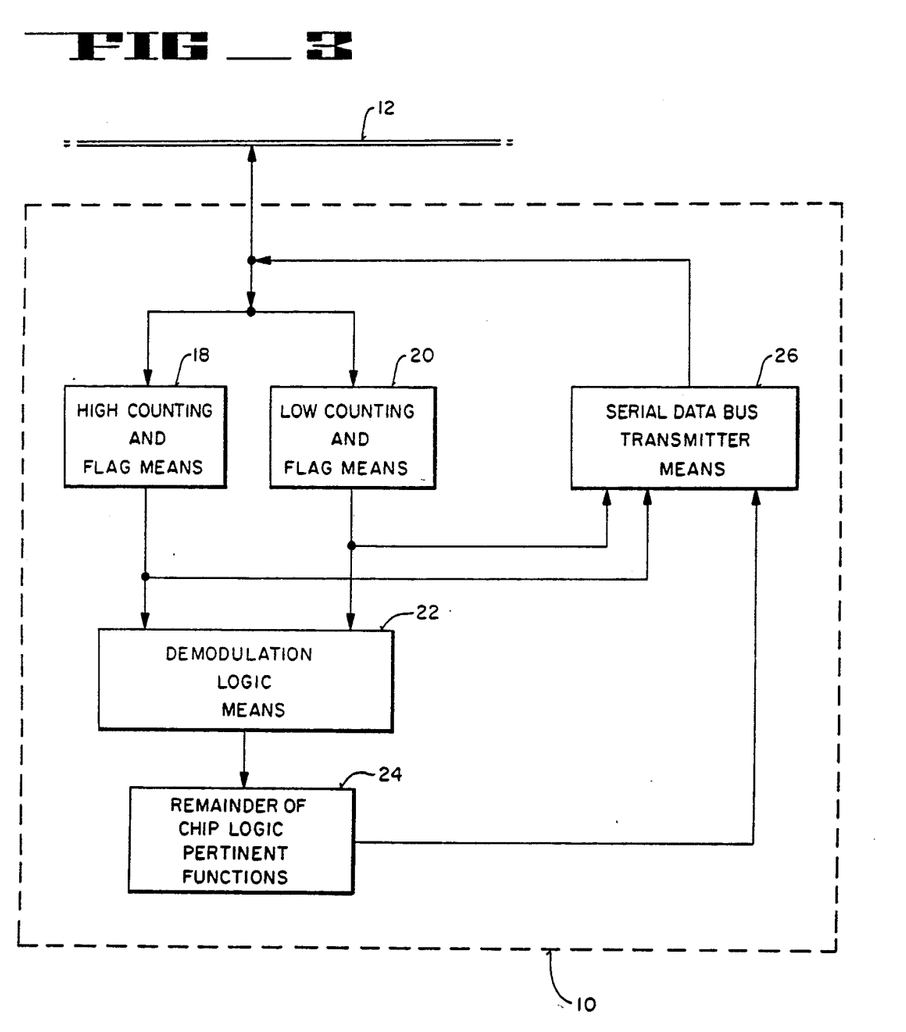
FIG. 3 is a functional block diagram representing the data transferring scheme of a preferred embodiment of the present invention.

Referring now to FIG. 3, a functional block diagram of the apparatus of the present invention is illustrated. High counting and flag means 18 and low counting and flag means 20 are coupled to the serial data bus 12 for determining temporal periods of high signal levels and low signal levels on the data bus. The high counter and low counter are preferably clocked by an external oscillator. The flag means preferably includes a plurality of flip-flop devices for storing flag status, such flags being activated at a predetermined count of either counter. Demodulation logic means 22 are coupled to the counting and flag means for demodulating the high and low signal levels to binary data. The demodulation logic 22 preferably includes a plurality of flip-flop devices and logic gates. This binary data is used to perform a pertinent function of the device. (For example, in a cursor control device, the pertinent function would be to move the cursor to the desired location on the display screen or, for example, the pertinent function of the keyboard would be to display a number or letter, etc.).

The output of the demodulation logic means 22 is input to the remainder of the chip logic 24 which performs the device's pertinent functions.

Serial data bus transmitter means 26 is directly coupled to the high and low counting and flag means and indirectly coupled to the demodulation logic means 22 via chip logic 24 for modulating binary data received from the device while performing its pertinent function. The transmitter means 26 preferably includes flip-flop devices so arranged to have the desired logic, as will be disclosed below. The resulting modulated data is input onto the serial data bus 12.

Figure 4:
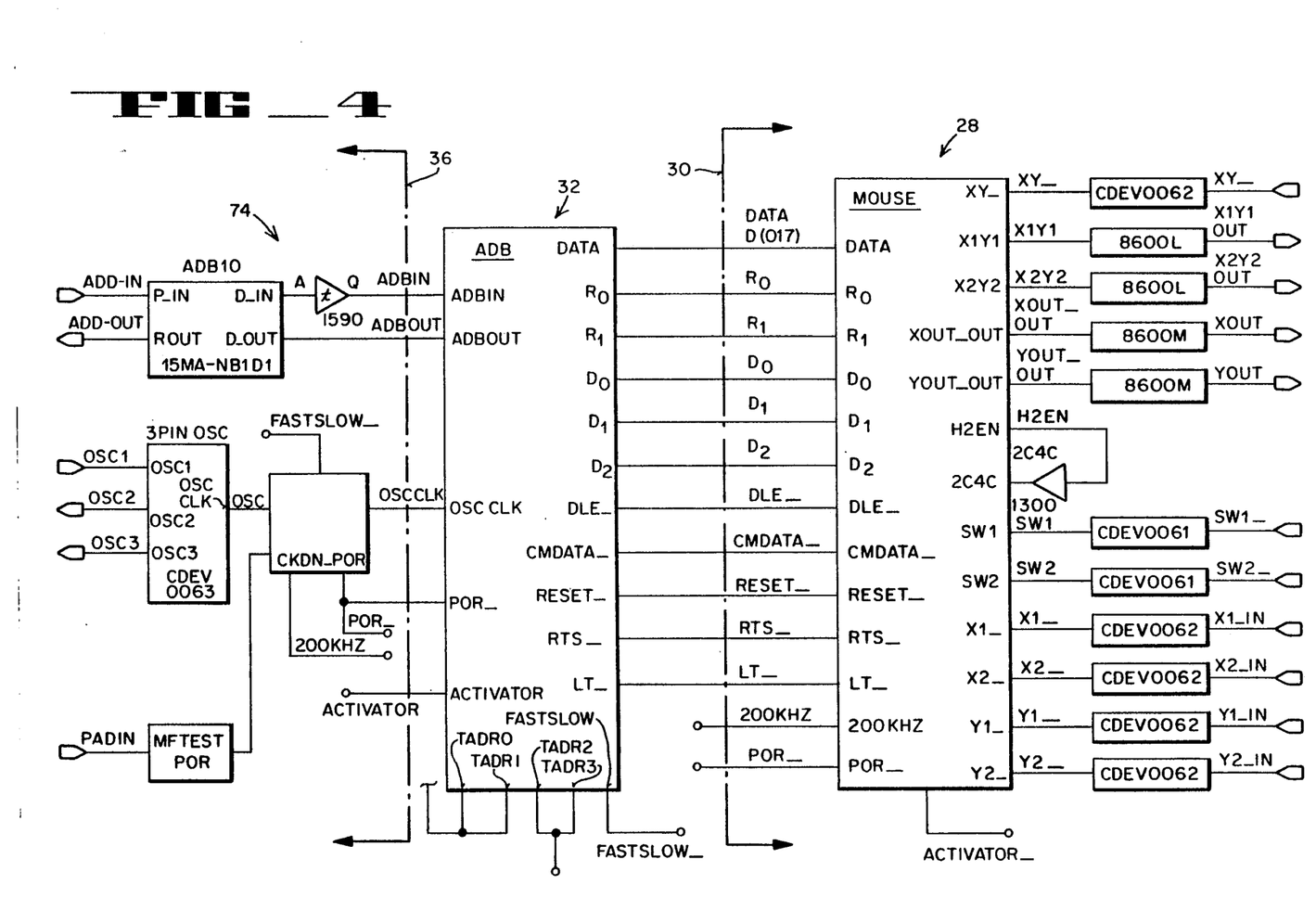
FIG. 4 is a block diagram of the application specific integrated circuit (ASIC) which may be used to implement a preferred embodiment in a cursor control device.

A specific implementation of the use of the principles of a preferred embodiment is illustrated in FIG. 4, which is a block diagram of the application specific integrated circuit (ASIC) for a mouse design. The "MOUSE" subchip of the ASIC, designated by numeral designation 28 to the right of dashed line 30 is the portion thereof used for encoding. It forms the desired pulses required for operation.

The core cell 32, identified as "ADB," illustrates the portion of the ASIC used for defining communication between the ASIC and the CPU. ADB is the abbreviation of Apple Desktop Bus. The portion 34 to the left of the dashed line 36 refers to the clock. Detailed discussions of the "MOUSE" subchip are contained in U.S. patent application Ser. No. 07/664,480, filed Mar. 4, 1991, which is a continuation of U.S. patent application Ser. No. 07/357,419, filed May 24, 1989, entitled "APPARATUS AND METHOD FOR OPTICAL ENCODING," now abandoned, and U.S. patent application Ser. No. 07/363,586, filed Jun. 8, 1989, entitled "APPARATUS AND METHOD FOR MINIMIZING UNDESIRED CURSOR MOVEMENT IN A COMPUTER CONTROLLED DISPLAY SYS- TEM," which issued as U.S. Pat. No. 5,027,109 on Jun. 25, 1991. The subject matter of application Ser. No. 07/363,586 is hereby incorporated by reference.

Figure 5A:
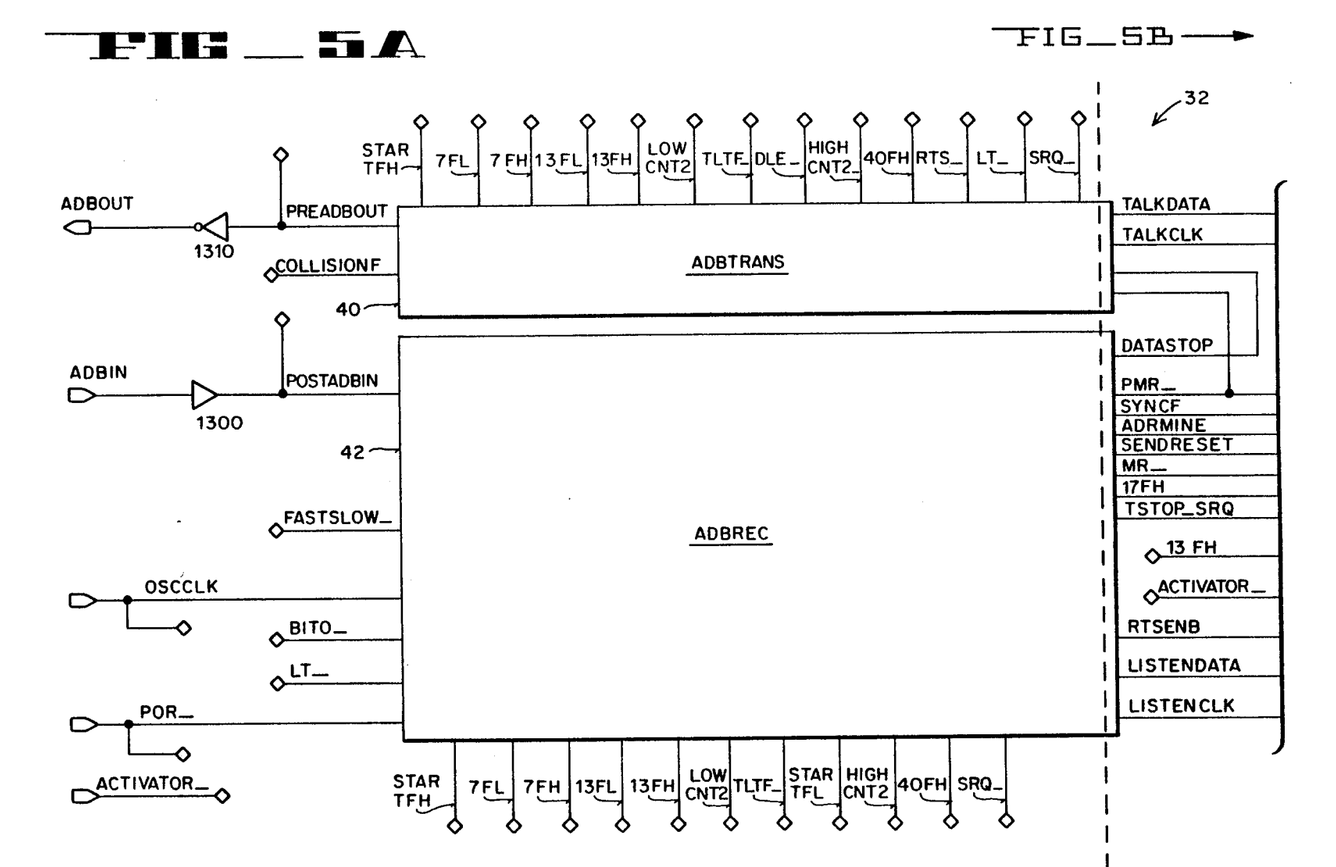
FIGS. 5A and 5B show lower level diagrams of the data bus subchip of the ASIC of FIG. 3.
Figure 5B:
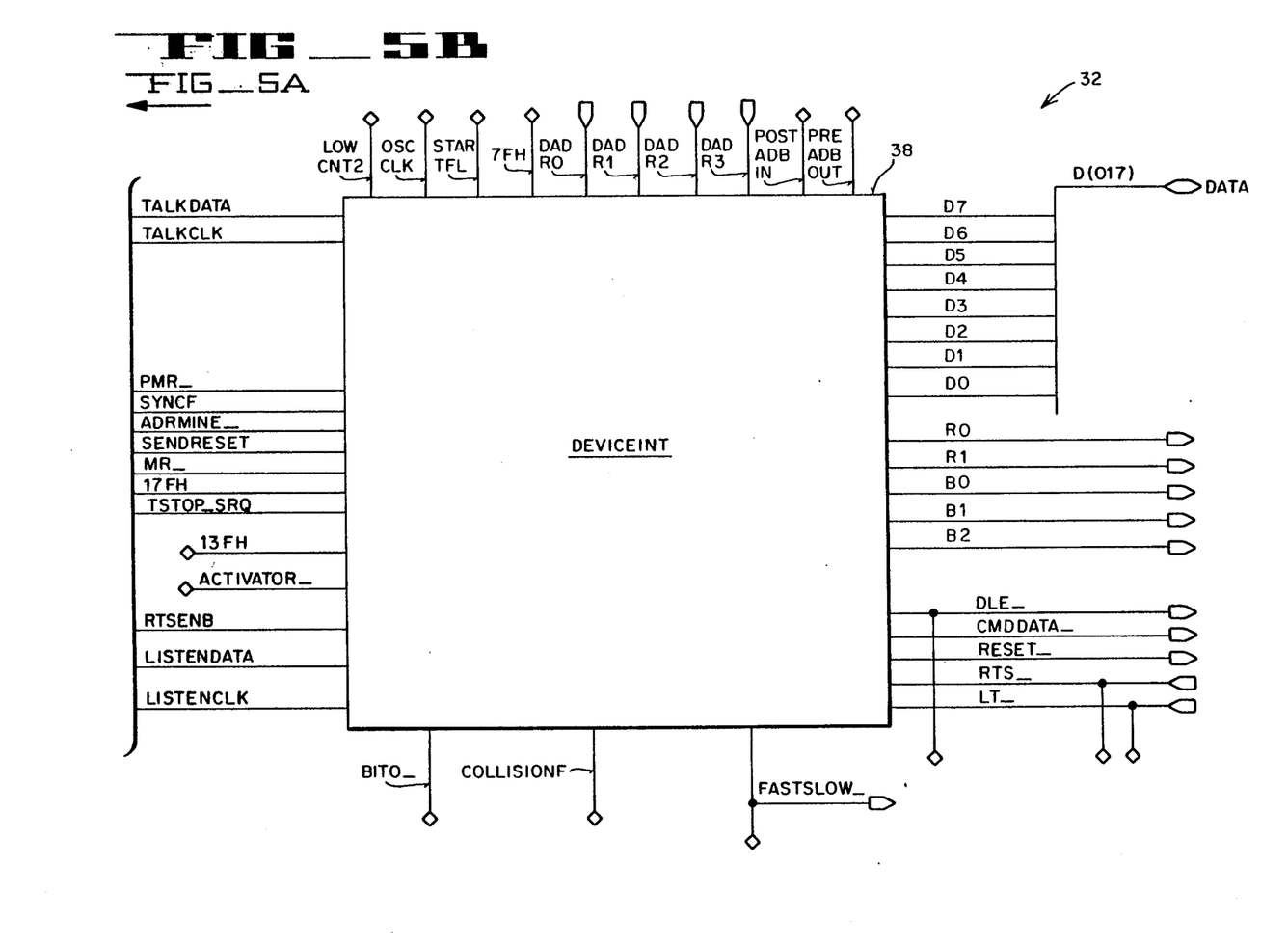

Referring now to FIGS. 5A and 5B, a lower level diagram of the ADB subchip 32 is illustrated. The ADB subchip 32 includes DEVICEINT 38 which is an interface with the MOUSE subchip 28 circuitry. ADBTRANS 40 provides the transmitting means for modulating binary data received from the device while performing its pertinent function, the resulting modulated data being input onto the serial data bus. The ADBREC 42 portion includes the counting and flag means.

Figure 6A:
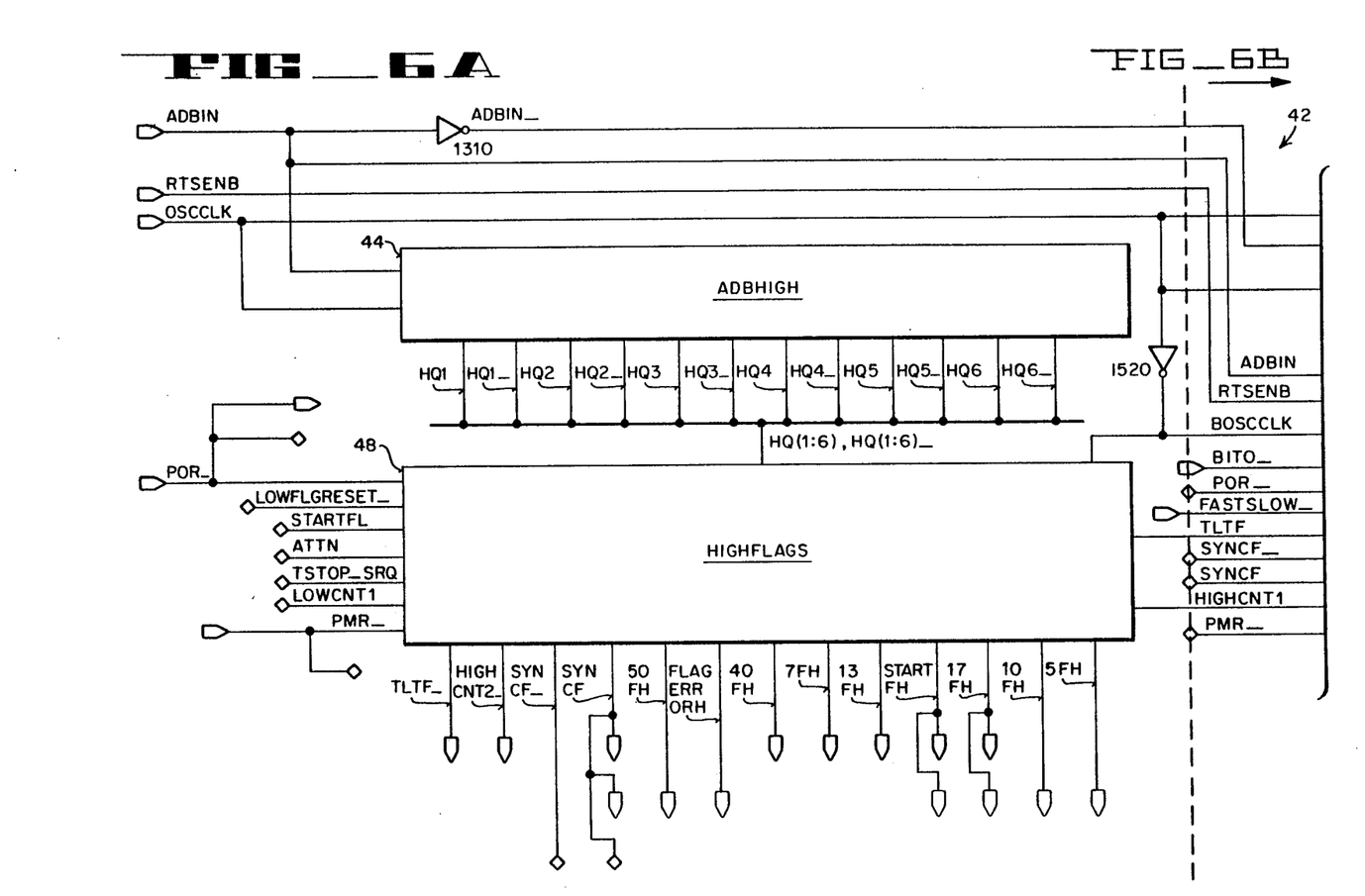
FIGS. 6A and 6B show lower level diagrams of a portion of the data bus subchip, illustrating the counters and flags.
Figure 6B:
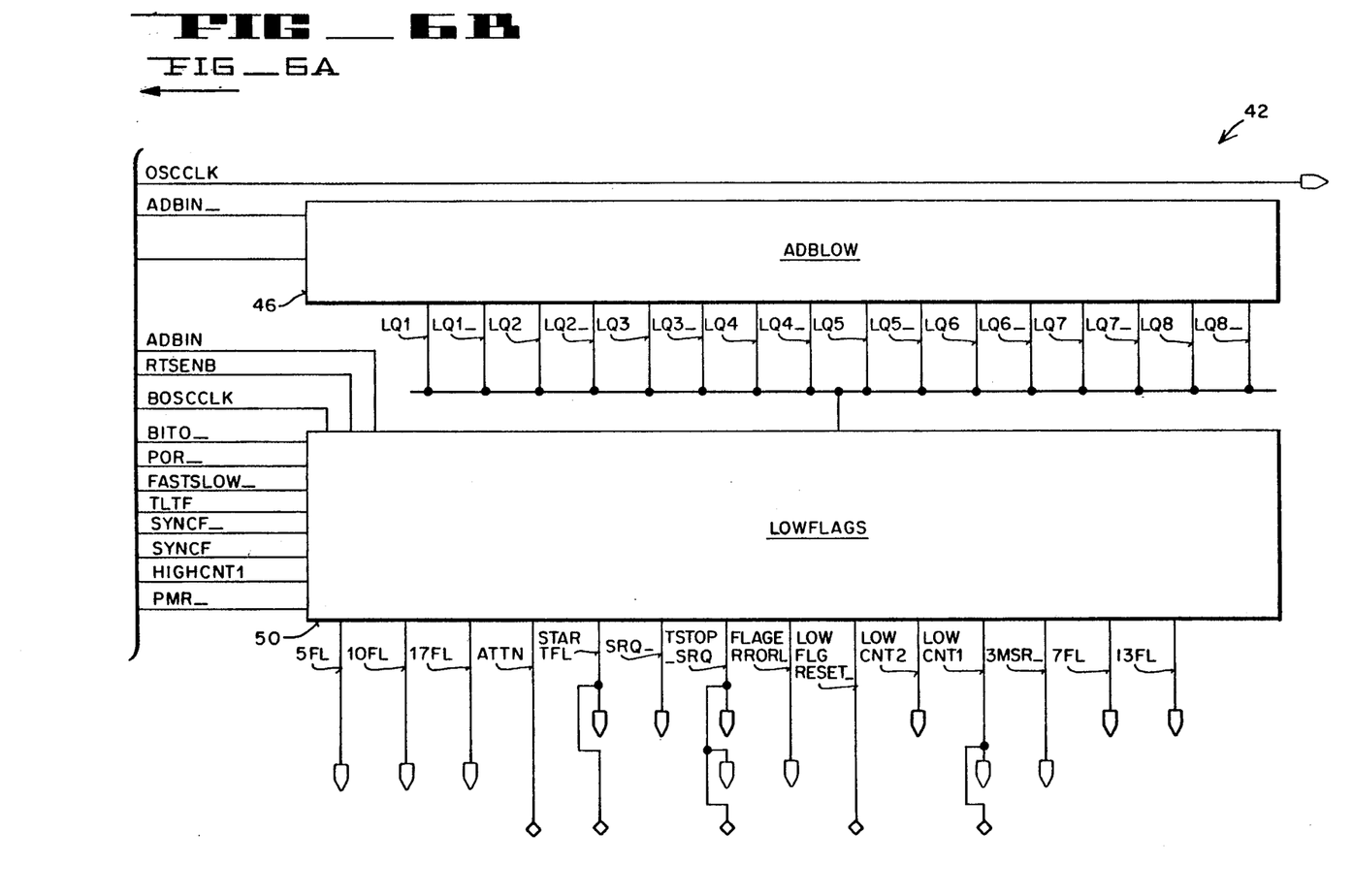

FIGS. 6A and 6B illustrate ADBREC 42. ADBREC 42 includes high counter 44 (ADBHIGH), the low counter 46 (ADBLOW), the flags associated with the high counter, i.e. HIGHFLAGS 48, and the flags associated with the low counter, i.e. LOWFLAGS 50.

Figure 7:
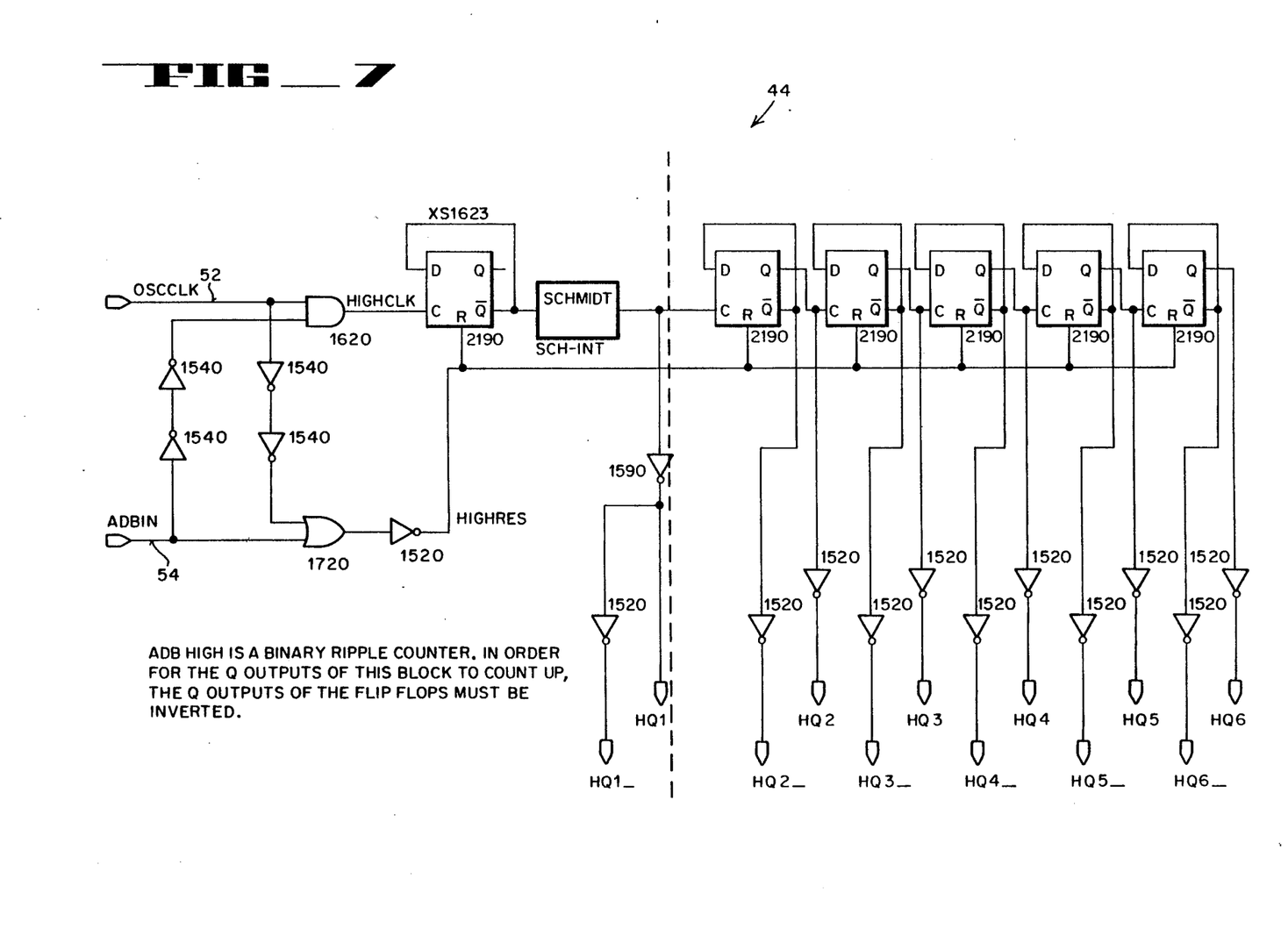
FIG. 7 is a logic diagram of the high counter of the ASIC.

FIG. 7 illustrates the logic diagram of the high counter (ADBHIGH 44). The input signal 52 (OSCCLK) from the external clock is applied to the RCA 1620 AND gate. The data bus input 54 (ADBIN) is applied to a series of 1540 inverters and then applied to the input of a 1620 AND gate. The output thereof (HIGHCLK) is applied to the C input of the RCA 2190 D-flip-flop. The Q input from the D-flip-flop is coupled to a Schmidt trigger, the output thereof coupled to a series of RCA 2190 D-flip-flops for counting. OSCLK, through 1540 inverters, and ADBIN are applied to the 1720 OR gate, the output from the 1720 OR gate is directed to the input of a 1520 inverter. The output (HIGHRES) of the 1520 inverter is coupled to the R, reset outputs of the 2190 D-flip-flops. The D input and Q output of each 2190 D-flip-flop is coupled to the same 1520 inverter while the Q outputs are coupled to other 1520 inverters.

Referring now to FIG. 8, a logic diagram of the low counter, ADBLOW 46, it may be seen that ADBLOW 46 is essentially the same as ADBHIGH 44. However, ADBIN_, the opposite of ADBIN, is input.

Figure 9:
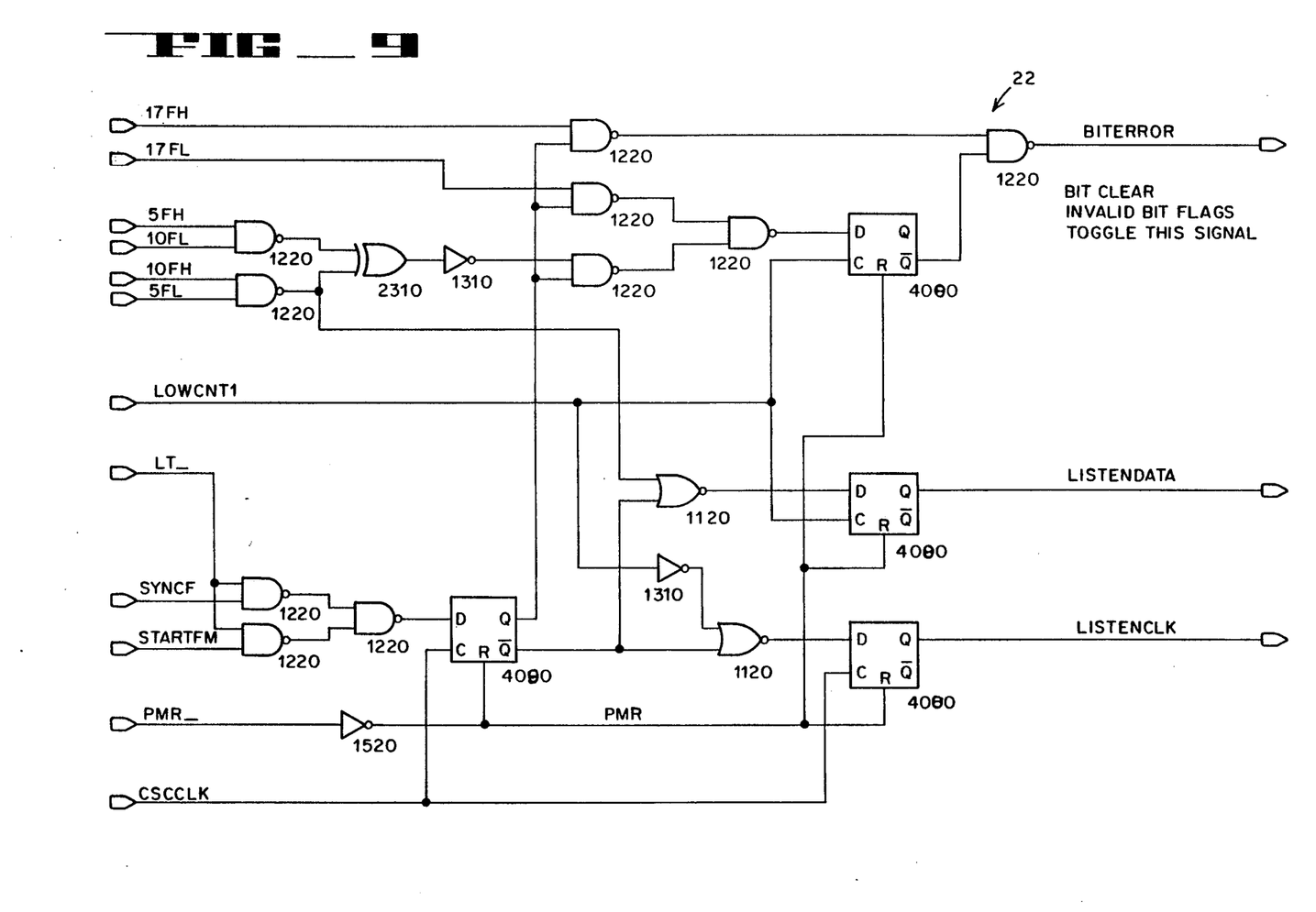
FIG. 9 illustrates the demodulation logic of the ASIC.
Figure 11:
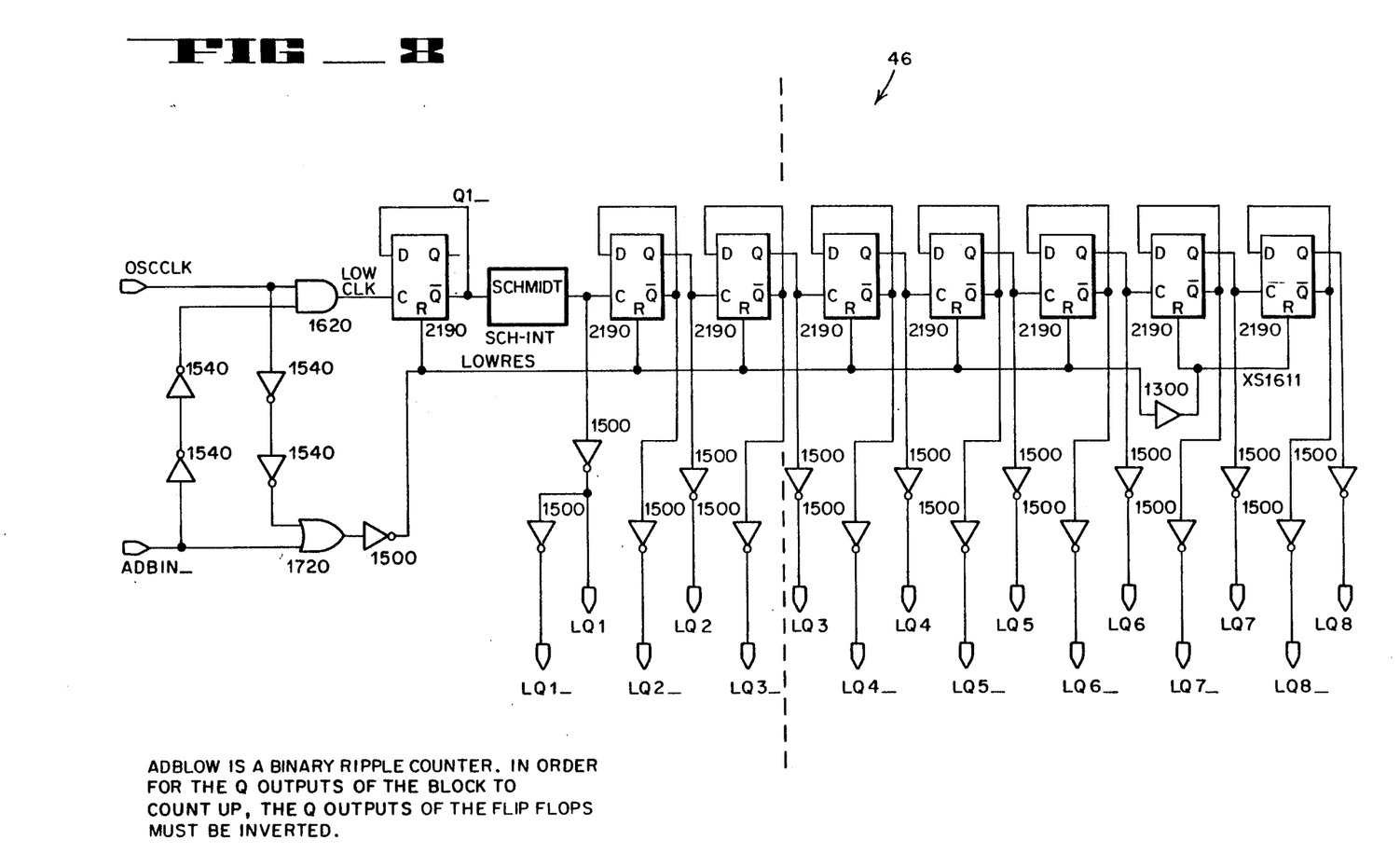

Referring now to FIG. 9, the demodulation logic means 22 is illustrated. If the synch flag (SYNCF) is set high then the command line will be demodulated within this block by using $5_{FL}$ (25 μSec.), $10_{FH}$ (50 μSec.), $10_{FL}$ (50 μSec.), $5_{FH}$ (25 μSec.), $17_{FL}$ (85 μSec.), and $17_{FH}$ (85 μSec.). A logic level "1" is demodulated if $5_{FL}$ and $10_{FH}$ are both set. This detects an equivalent bit cell time of ⅓ low and ⅔ high. A logic level "0" is demodulated if $10_{FL}$ and $5_{FH}$ are both set. This detects an equivalent bit cell time of ⅔ low and ⅓ high. If $START_{FH}$ is set high then the data on the data bus is demodulated in the same way as the command line was with the Synch flag being set high using $5_{FL}$, $10_{FH}$, $5_{FH}$, $10_{FL}$, $17_{FH}$, and $17_{FL}$. The LT, listen-talk line, along with SYNCHF and $START_{FH}$, is used to let the receive bit decode block 22 know when to demodulate. The output LISTENDATA and LISTENCLK are coupled to the rest of the chip to allow the demodulated data to be in binary form. The bit error output, if set high by an invalid bit determined by the $17_{FL}$ and $17_{FH}$ times being reached, will cause the device to abort all data demodulation and subsequently the device will look for the next valid attention signal on the data bus.

As noted, the inputs to the demodulation logic means 22 include $17_{FH}$, $17_{FL}$, $5_{FH}$, $10_{FL}$, $10_{FH}$, and $5_{FL}$ from the flags illustrated in FIGS. 6A and 6B. Another input is LOWCKT1 from the low counter, as illustrated in FIGS. 6A and 6B. LT_, from the mouse specific part of the chip, is also input. SYNC and STARTFH are also input from the counters.

FIG. 10 illustrates the transmitter means portion (e.g. ADBTRANS 40) of the ADB subchip 32. The input LT_, listen-talk line, comes from the device specific portion 28 of the chip. LT_ is used in conjunction with the input TLTF_, stop bit to start bit time. LT_ and TLTF_ inputs determine whether the transmitter means 40 should talk onto the data bus using the modulation means. If LT_ is set to talk state and TLTF_, which comes from the counter and flags block, is set high, then the ADBTRANS 40 begins to modulate.

The STARTFH input, flag from the counter and flags block, allows the start bit to be modulated onto the data bus through the output ADBOUT shown in FIG. 10. Once the start bit is finished being modulated then the data from the device specific portion on the chip is modulated onto the data bus. This data is determined by the logic levels of $7_{FL}$ (35 μSec.), $13_{FH}$, (65 μSec.), $7_{FL}$ (35 μSec.), $13_{FL}$ (65 μSec.), and $40_{FH}$ (200 μSec.) which come from the counter and flags blocks. Additionally, the TALKDATA input line from the device interface portion of the chip helps modulate out bit cell times representing logic "1's" and "0's." Depending on the logic level of the TALKDATA line, a logic "0" or "1" is modulated into a bit cell of "0" or "1." A logic "0" is modulated by using the $13_{FL}$ and $7_{FH}$ input lines and a logic "1" is modulated by using the $7_{FL}$ and $13_{FH}$.

The other inputs to FIG. 10 are used to help regulate the transmitter means 40.

The output TALKCLK is used to regulate the TALKDATA input. TALKCLK goes to the device interface portion of the chip. The DATASTOP output line is used to signify the end of a transmitting means transaction to prepare the ADB subchip to look for a new Attention pulse and Synch pulse, as shown in FIG. 2, which shows a typical data bus transaction.

By linking the transmitting means to the counting mechanism and the demodulation logic the amount of counting devices is reduced as compared to the conventional communication system previously referred to. Minimizing the number of counting devices results in a relatively less expensive, more reliable system. This reduction is possible due to the fact that, on a serial bus, demodulation and modulation never occur at the same time. One is either receiving, transmitting, or waiting to receive or transmit.

The principles herein disclosed may be utilized, for example, with a CPU and/or peripheral devices such as cursor control devices, keyboards, printers, and scanners.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:
1. An apparatus for transferring data between devices located on a serial data bus of a data communication system, comprising:
   (a) first counting and flag means associated with a first device on said serial data bus, said first counting and flag means being coupled to said serial data bus for determining temporal periods of high signal levels on said data bus;

(b) second counting and flag means associated with the first device on said serial data bus, said second counting and flag means being coupled to said serial data bus for determining temporal periods of low signal levels on said data bus;

(c) demodulation logic means coupled to said first and said second counting and flag means for demodulating said high and low signal levels to binary data and using this binary data to perform a pertinent function of said first device; and (d) transmitting means coupled to an output of said first and second counting and flag means and to said demodulation logic for modulating binary data received from a portion of said first device while performing its pertinent function, the resulting modulated data being input onto said serial data bus.

2. The apparatus of claim 1, wherein said transmitting means is directly coupled to said first and said second counting and flag means and is indirectly coupled to said demodulation logic means via said portion of said first device for modulating binary data received from said first device while performing its pertinent function, the resulting modulated data being input onto said serial data bus.

3. The apparatus of claim 2, wherein said first counting and flag means includes:

a high counter for receiving signals from said serial data bus, said high counter being clocked by an external oscillator; and a high flag means having a plurality of high flags, each high flag being activated at a predetermined count of said high counter for modulating and demodulating data.

4. The apparatus of claim 3, wherein said second counting and flag means includes:

a low counter for receiving signals from said serial data bus, said low counter being clocked by an external oscillator; and a low flag means having a plurality of low flags, each low flag being activated at a predetermined count of said low counter for modulating and demodulating data.

5. The apparatus of claim 4, wherein said low flag means and said high flag means each include a first plurality of flip-flop devices for storing flag status.

6. The apparatus of claim 5, wherein said demodulation logic includes a second plurality of flip-flop devices and logic gates.

7. The apparatus of claim 6, wherein said serial data bus transmitter means includes means for utilizing said first plurality of flip-flop devices, said second plurality of flip-flop devices, and said logic gates for modulating said binary data received from said device while performing its pertinent function.

8. The apparatus of claim 1, wherein said first device is a cursor control device.

9. The apparatus of claim 1, wherein said first device is a keyboard.

10. The apparatus of claim 1, wherein said first device is a CPU of a computer.

11. A method for transferring data between devices located on a serial data bus of a data communication system, comprising the steps of:

(a) determining relative periods of high signal levels and low signal levels on said data bus;

(b) utilizing said determinations to demodulate said high and low signal levels to binary data to perform a pertinent function of a first device on said data bus; and (c) utilizing said determinations of said relative periods and said demodulated binary data for modulating binary data received from a portion of said first device while performing its pertinent function, the resulting modulated data being input onto said serial data bus.

* * * * *